Nov. 4, 1958 R. W. KETCHLEDGE 2,859,413

DISTORTION CORRECTION

Filed Sept. 4, 1953 2 Sheets-Sheet 1

INVENTOR
R. W. KETCHLEDGE

BY Ralph T. Holcomb
ATTORNEY

\+ ATTENUATION DETECTOR

\- ATTENUATION DETECTOR

INVENTOR
R. W. KETCHLEDGE
BY Ralph T. Holcomb
ATTORNEY

United States Patent Office 2,859,413

Patented Nov. 4, 1958

2,859,413

DISTORTION CORRECTION

Raymond W. Ketchledge, Whippany, N. J., assignor to Bell Telephone Laboratories, Incorporated, New York, N. Y., a corporation of New York Application September 4, 1953, Serial No. 378,530

17 Claims. (Cl. 333—28)

This invention relates to signal transmission systems and particularly to means for correcting or equalizing imperfections in the gain and phase or delay of such transmission systems.

An object of the invention is to provide data for equalization in such a form as to avoid trial and error adjustment of equalizers.

A second object is to make equalizer adjustment more rapid and accurate.

A third object is to permit simple adjustment of equalizers having shapes chosen without restrictions.

Signal transmission systems, particularly those which transmit a wide frequency band over a considerable distance, suffer from transmission imperfections. These imperfections arise from the inability of the system designer to construct amplifying devices and fixed equalizers which exactly correct for the variations in the attenuation and phase, or delay, characteristics of the system. Furthermore, transmission through the system may be variable due to aging, temperature changes, or other reasons. Therefore, it is necessary to provide the system with adjustable equalizing networks which can be so adjusted as to remove the bulk of the transmission imperfections. Typical loss correcting networks of this type are described, for example, in a paper entitled "Variable Equalizers," by H. W. Bode, in the Bell System Technical Journal, April 1938.

Equalizers introduce shapes which, in general, interact in the sense that each of several shapes may control the transmission of a particular frequency. By shape is meant the change in the attenuation or delay of the network as a function of frequency. Thus, it is difficult to determine the best setting of the various equalizer shapes since many combinations of settings will yield good equalization at a particular frequency.

It has, therefore, become a common practice to use shapes which interact as little as possible in the sense of frequency overlap of the shapes. While this eases the adjustment problem by making the transmission of a particular frequency primarily dependent upon a particular equalizer control or shape, it also tends to degrade performance because broad overlapping shapes generally yield a more accurate equalization. Thus, one object of the present invention is to remove the restrictions on the choice of practical equalizer shapes.

In the past, manual equalizers have been adjusted by taking the system out of service, measuring its transmission, adjusting the equalizers, remeasuring the transmission, readjusting, and continuing the process until the desired transmission is obtained. For a complex equalizer with many controls, this takes considerable time because of the trial-and-error nature of the process. On the other hand, the present invention permits the direct determination of the required equalizer adjustments and thereby eliminates trial and error.

In accordance with one embodiment of the invention, an adjustable attenuation or delay equalizer and one or more suitable weighting networks are associated with the transmission line to be equalized, a suitable multiple-frequency signal is applied to the combination, and the change in the average transmission caused by the insertion of the weighting network is determined. The change thus found is proportional to the required equalizer adjustment. The equalizer may have one or more adjustable shapes. These shapes are unrestricted as to form but may advantageously be orthogonally related. The applied signal may be obtained from a constant-level source of a periodic sweep-frequency or other multiple-frequency voltage which covers the range to be equalized. The received signal is passed through one or more detectors and displayed on a voltmeter the reading of which is indicative of the direction and amount of the adjustment to be made in the equalizer shape to equalize the transmission line. Alternatively, the voltmeter reading may be recorded for future use or the voltage may be applied directly to a control element of the equalizer to effect an automatic adjustment. If the equalizer has more than one adjustable shape, one or more different weighting networks are substituted, for each of the shapes, and the shapes are adjusted one at a time. If the equalizer shapes are orthogonally related, no weighting networks are required but they may be used for added accuracy. The adjustment of each shape is independent of the adjustment of the other shapes, so that no readjustment is necessary. A predistorter may be associated with the line if a transmission characteristic other than flat is desired. Also, in some cases it is desirable to include in the line a wave filter which will transmit only the frequency range to be equalized.

The nature of the invention and its various objects, features, and advantages will appear more fully in the following detailed description of preferred embodiments illustrated in the accompanying drawings, of which Fig. 1 is a block diagram of an adjusting circuit in accordance with the invention for use with either attenuation or delay equalizers;

Figure 14:
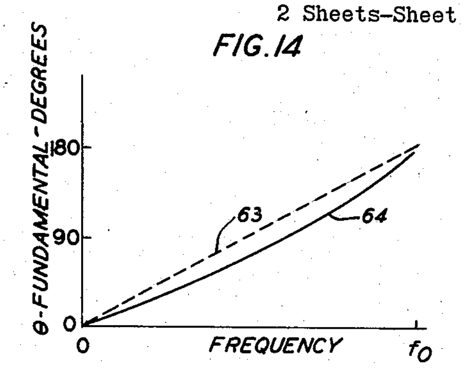
Figure 15:
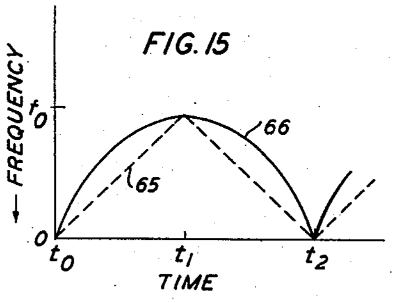

Fig. 14 presents graphs of the phase of the fundamental versus frequency for equalizer shapes which are cosine curves on linear or warped frequency scales, respectively; and Fig. 15 shows frequency versus time characteristics for linear and warped scanning, respectively.

By way of introduction, some of the theory underlying the invention will be presented. Consider a transmission system provided with a total of N adjustable equalizer shapes. Assume for the moment that the transmission error of the system consists solely of a shape which is a linear combination of the shapes available in the equalizer. There exists, therefore, a setting for each equalizer shape which, in combination with the others, completely corrects for the transmission error. The required settings can be determined by trial and error, but this inefficient process can be avoided by a process equivalent to the solution of simultaneous equations. These equations are developed on the basis that the sum of the required individual equalizer shapes must equal the total system error at all frequencies. In an actual case where the system error cannot be perfectly corrected using the available equalizer shapes, an exact correction can be obtained only at a limited number of frequencies, and there will be small errors at the frequencies between the match points.

The determination of the required adjustments when one is given a set of equalizer shapes and given a system equalization error may be expressed as follows:

Let the equalizer shapes be given by functions of the form $$S_n(f)=k_nF_n(f) \qquad (1)$$

where the subscript $n$ identifies the particular equalizer shape; $F_n(f)$ is the equalizer shape, on a unit basis, as a function of the frequency $f$; $k_n$ is a factor corresponding to the amount of shape introduced by the adjustment and may be either positive or negative; and $S_n(f)$ is the resultant shape put in the system by adjusting $F_n(f)$ by an amount $k_n$.

The total shape introduced by all N equalizer shapes is obviously $$S_{\text{total}}(f)=\sum_{n=1}^{n=N}S_n(f)=\sum_{n=1}^{n=N}k_nF_n(f) \qquad (2)$$

To obtain a match of $S_{\text{total}}$ to the given equalization error, $S_{\text{given}}$, at M frequencies from $m=1$ to $m=M$, requires that $$S_{\text{total}}(f_m)=S_{\text{given}}(f_m) \qquad (3)$$

at each frequency from $f_1$ to $f_M$. Or, in terms of Equation 2, $$S_{\text{given}}(f_m)=\sum_{n=1}^{n=N}k_nF_n(f) \qquad (4)$$

again, at each frequency from $f_1$ to $f_M$.

Thus, it is clear that a computational operation equivalent to the solution of simultaneous equations can be used to determine the proper equalizer adjustment. The present invention, however, accomplishes this result on a continuous rather than discontinuous frequency scale. The match points are, therefore, not arbitrarily selected frequencies.

One can postulate the existence of a weighting function $G(f)$ which, when multiplied by the equalization error $S_{\text{given}}$, will give an indication of the required adjustment of a particular equalizer shape. Since both S and G are functions of frequency, their product is also a function of frequency. Therefore, an averaging process is required to obtain the value of $k_n$, which is the amount of the shape to be introduced. If this averaging process is indicated by a superscript bar, we may write the expression $$\overline{S_{\text{given}}(f)G_u(f)}=k_n \qquad (5)$$

where the subscript $u$ denotes the particular weighting function. To show that such a family $G_u(f)$ exists, consider a case where Equation 3 is rigorously true, that is, where the total of the equalizer shapes introduced exactly compensates for the equalization error. Then $S_{\text{total}}$ may be substituted for $S_{\text{given}}$ in Equation 5 and the resulting value of $k_n$ substituted in Equation 2 to obtain the expression $$S_{\text{total}}(f)=\sum_{n=1}^{n=N}\overline{S_{\text{total}}(f)G_u(f)}F_n(f) \qquad (6)$$

It can be shown from Equation 6 that, when $u$ equals $n$, $$\sum_{n=1}^{n=N}\overline{G_u(f)F_n(f)}=1 \qquad (7)$$

Equation 7 expresses one necessary condition which must be placed on the weighting functions, namely, that the average of the product of the weighting function and the corresponding equalizer function shall be equal to unity.

Another necessary condition is that an adjustment of one of the equalizer shapes should not require the readjustment of any other equalizer shape. This may be expressed in terms of the resultant shape as $$\overline{S_n(f)G_u(f)}=0 \qquad (8)$$

when $n$ does not equal $u$. Expressed in terms of the equalizer functions, $$\overline{F_n(f)G_u(f)}=0 \qquad (9)$$

when $n$ does not equal $u$.

From these required relationships, it can be deduced that the weighting function must be so selected that $$\overline{G_u(f)F_n(f)}=1 \qquad (10)$$

when $u$ equals $n$ and $$\overline{G_u(f)F_n(f)}=0 \qquad (11)$$

when $u$ does not equal $n$.

Equations 10 and 11 show that if the equalization error of the system is transmitted through a weighting network having a transmission characteristic $G_u(f)$, the average of the resultant signal will be proportional to $k_n$, the amount of the $n$th equalizer shape required to equalize the system. It will be noted that the theory here presented extends the computational concept from discrete to continuous frequency sampling of the system.

It can be shown that, for a finite number of given equalizer shapes, many families of weighting functions exist. Thus, in general, the weighting functions may be chosen to yield the best type of equalization for the particular problem at hand. If the equalizer shapes are all members of an infinite orthogonal set which will compensate the equalization error perfectly, then any set of weighting function meeting equations 10 and 11 for the infinite series is as good as any other. The resultant error will be due to the fact that only a finite number of terms are available in the equalizer. In this case, the equalization solution obtained is the adjustment that should be used if an infinite number of terms were available. In complicated cases, the choice of the weighting functions can often be simplified if one treats the equalizer shapes as members of an infinite set needed to obtain perfect equalization.

An interesting example of the validity of the concepts outlined herein can be derived from the established theory of Fourier analysis. If the equalizer shapes are members of an infinite harmonic set, they are equivalent to the terms of a Fourier series. The shapes are orthogonally related and, if the number is infinite, they are capable of describing any given continuous function perfectly. The coefficients $A_n$ or $B_n$ of a Fourier series can be found from the relationships $$A_n=\frac{1}{\pi}\int_0^{2\pi}F(\theta)\sin n\theta d\theta \qquad (12)$$

for an odd function and $$B_n=\frac{1}{\pi}\int_0^{2\pi}F(\theta)\cos n\theta d\theta \qquad (13)$$

for an even function. These relationships describe $F(\theta)$ for values of $\theta$ falling between zero and $2\pi$. The $A_n$'s and $B_n$'s are the coefficients of the sine and the cosine terms, respectively, and correspond to the $k_n$'s of the equalizer shapes. The correspondence of the integration to an averaging process and of sine $n\theta$ or cosine $n\theta$ to the weighting function is obvious. To find the $A_n$ content of $F(\theta)$, we weight $F(\theta)$, by sin $n\theta$, average (integrate) their product, and thereby get the $A_n$ sin $n\theta$ content of $F(\theta)$. In general, we take $S_{\text{given}}$ times $G_u$, average, and get $k_n$.

To summarize, the equalizer-adjusting procedure in accordance with the present invention comprises the following steps: A suitable multiple-frequency signal covering the entire frequency range to be equalized is transmitted through the combination of line and associated adjustable equalizer, the resultant transmission is multiplied at each frequency by an appropriate weighting function by means of a suitable network inserted into the signal path, and the change in the average transmission due to the insertion of the weighting network is observed. This observed change in transmission is proportional to the required equalizer adjustment. If the equalizer shapes are orthogonal, no added weighting networks are required but they may be included to increase the precision of adjustment.

Alternatively, the transmission deviation may be transmitted through the weighting-averaging circuit to indicate the required equalizer adjustment directly, without insertion or removal of networks during the measurement.

Figures 1, 2, 4, 6:
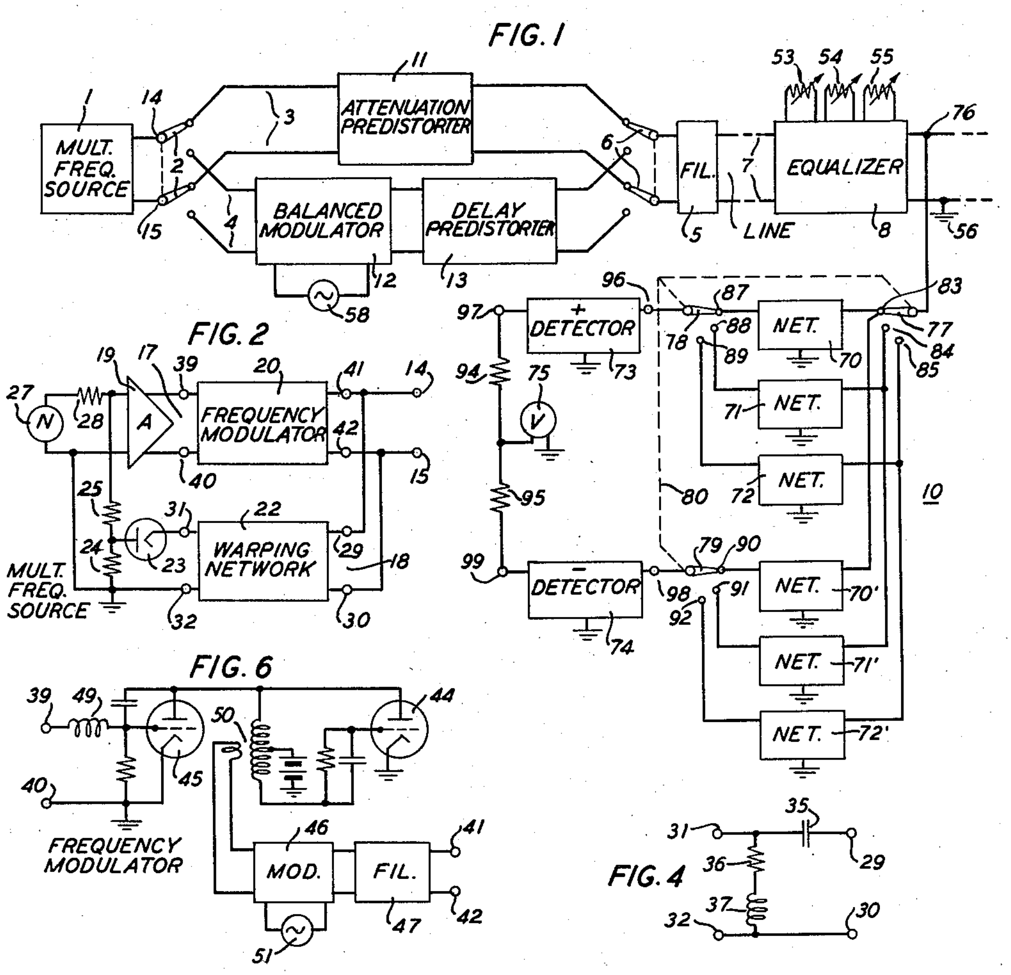
Fig. 2 is a schematic circuit, partly in block, of a sweep type of multiple-frequency source suitable for use in the circuit of Fig. 1.
Fig. 4 is a schematic circuit of a warping network suitable for use in the circuit of Fig. 2.
Fig. 6 is a schematic circuit, partly in block, of a frequency modulator suitable for use in the sweep-source circuit shown in Fig. 2.

Taking up the figures in greater detail, Fig. 1 shows the general arrangement of an equalizer-adjusting circuit in accordance with the invention for use with either an attenuation or a delay equalizer. A multiple-frequency source 1 is connected, by means of the switches 2 and 6, through one of the two parallel branches 3 and 4 to a signal transmission line or other circuit 7 to be equalized. Included in the line 7 are a wave filter 5 and an adjustable attenuation or delay equalizer 8. A weighting-averaging circuit 10 is connected to the other end of the line 7. The equalizer 8 is ordinarily located at the receiving end of the line so that the equalizer may conveniently be adjusted in accordance with the indication obtained from the circuit 10. The upper branch 3 includes an attenuation predistorter 11. The lower branch 4 includes a balanced modulator 12 and a delay predistorter 13 connected in tandem. When the equalizer 8 is an attenuation equalizer, the switches 2 and 6 are thrown to the upper position, as shown, so that the source 1 is connected to the line 7 via the upper branch 3. When the equalizer 8 is a delay equalizer, the switches are thrown to the lower position so that the lower branch 4 is in circuit.

The function of the source 1 is to provide at the terminals 14, 15 a voltage which is constant in amplitude but varies in frequency in a prescribed manner over the frequency range to be equalized. This voltage may sweep the range or it may be a series of discrete frequencies generated either simultaneously or sequentially. However, in the particular embodiment shown in Fig. 1, a sweep-frequency source is preferred. A suitable circuit is shown in Fig. 2.

As shown in Fig. 2, the sweep source 1 is a network of the feedback type, comprising a principal or mu circuit 17 and a feedback or beta circuit 18. The mu circuit 17 includes an amplifier 19 followed by a frequency modulator 20. The beta circuit 18 comprises a warping network 22, a rectifier 23, and a load resistor 24 grounded at one end. The voltage of the triangular wave generator 27 and that across the load resistor 24 are nearly equal but of opposite sign. These voltages are added algebraically by the resistance network 25, 28 and delivered to the amplifier 19. The amplifier 19 applies the difference of these voltages to the frequency modulator 20. Thus, through the feedback action in the beta circuit 18, the output frequency on the terminals 14, 15 is related in a desired manner to the voltage from the generator 27 by the warping network 22, which determines the relative amount of time the sweep-frequency signal spends in the vicinity of a given frequency. The amount and nature of the desired warping of the frequency-time relationship depends upon the shapes provided by the equalizer 8 and will be discussed in greater detail hereinafter.

Figure 3:
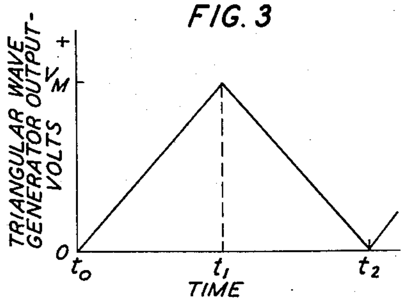
Fig. 3 is the voltage versus time characteristic of a triangular wave generator suitable for use in the circuit of Fig. 2.

Fig. 3, which is a plot of voltage versus time, shows a suitable output wave for the triangular wave generator 27. The voltage rises linearly from zero at the time $t_0$ to a maximum value $V_M$ at the time $t_1$, decreases linearly to zero at the time $t_2$, and then repeats the cycle continuously. In certain, but not all, cases it is useful to place $t_1$ midway between $t_0$ and $t_2$.

Fig. 4 shows a circuit suitable for the warping network 22 of Fig. 2. The network has a pair of input terminals 29, 30 and a pair of output terminals 31, 32 which correspond, respectively, to the similarly numbered terminals shown in Fig. 2. The circuit comprises a series capacitor 35 between the terminals 29, 31 and a shunt branch constituted by the series combination of a resistor 36 and an inductor 37 connected between the output terminals 31, 32. The values of the elements 35, 36, 37 are so chosen that, for a constant input voltage on the terminals 29, 30, the output voltage on the terminals 31, 32 has the frequency response shown by the curve of Fig. 5. Over a band of frequencies extending, in this case, from zero to $f_0$ the characteristic falls from zero to a maximum negative value of $V_M'$, which is approximately equal to the maximum value $V_M$ of the output voltage from the triangular wave generator 27, shown in Fig. 3. The output voltage is shown as negative in Fig. 5 to stress the fact that the alternating-current output from the network 22 is applied to the rectifier 23 to produce across the load resistor 24 a direct-current voltage whose polarity is opposite to that of the generator 27. As explained below, the warping network 22 may be omitted in some cases.

Fig. 6 shows a suitable circuit for the frequency modulator 20 of Fig. 2. The input terminals 39, 40 and the output terminals 41, 42 correspond to the similarly designated terminals in Fig. 2. The function of the frequency modulator 20 is to convert the voltage versus time characteristic received from the amplifier 19 into a frequency versus time characteristic of the type shown in Fig. 15. As shown, the circuit comprises an oscillator tube 44, a reactance tube 45, a modulator 46, and a filter 47. The input voltage is impressed upon the grid-cathode circuit of the tube 45 through a choke coil 49. The plate-cathode circuit of the tube 45 is shunted across the tuned circuit of the oscillator tube 44. The reactance tube 45 thus converts a voltage on the input terminals 39, 40 into a reactance which controls the frequency of the oscillator tube 44. The operation of this type of circuit is described in greater detail in "Radio Engineers' Handbook," by F. E. Terman, first edition, 1943, pages 654 and 655. The output of the tube 44 is fed through the coupled coils 50 to the modulator 46, which is driven by a fixed-frequency oscillator 51. The combination of the variable-frequency oscillator comprising the tube 44 and associated components, the fixed-frequency oscillator 51, and the modulator 46 constitutes a beat-frequency oscillator. The operation of beat-frequency oscillators is well known and is described, for example, on pages 507, 508 and 509 of the above-mentioned handbook. The modulator 46 may, for example, be of the copper oxide type, such as is shown in Fig. 24 on page 553 of the book cited above. The output from the modulator 46 is passed through the low-pass filter 47, to eliminate the undesired sidebands, and is available at the output terminals 41, 42. In one embodiment of the invention which has been successfully operated, the tube 44 oscillates at frequencies ranging between 70 and 80 megacycles, under the control of the reactance tube 45, the oscillator 51 has a fixed frequency of 80 megacycles, the filter 47 cuts off at 25 megacycles, and the output wave at the terminals 41, 42 is substantially constant in amplitude but varies in frequency cyclically between zero and ten megacycles.

Returning now to Fig. 1, the predistorter 11 or 13 is required only when it is desired that the combination of the line 7 and the equalizer 8 should have a transmission-frequency characteristic which is other than flat or constant. For example, assume that the switches 2 and 6 are in the positions shown, that the attenuation predistorter 11 has a rising loss-frequency characteristic, and that the attenuation equalizer 8 has been adjusted for a flat over-all transmission characteristic. Then, when the attenuation predistorter 11 is removed, the line 7 and the equalizer 8, in combination, will have a falling loss characteristic which is just the inverse of that of the predistorter 11. It is sometimes desirable to provide this, or some other, type of characteristic in order to equalize for transmission distortion known to exist in another part of the system. The delay predistorter 13 may be used to accomplish a similar result when the circuit is used for the equalization of delay.

The function of the balanced modulator 12, in the lower branch 4 which is used in delay equalization, is to change the instantaneous frequency of the sweep source 1 into a pair of frequencies having a constant spacing between them. This constant spacing is termed the interval frequency. It is well known in the art that such a pair of frequencies may be used to determine the delay in a transmission system. Suitable balanced modulator circuits for generating a double sideband wave with carrier suppressed are shown in Fig. 22 on page 551 of the handbook cited above. In one embodiment, when the output from the sweep source 1 varied from zero to ten megacycles, the fixed oscillator 58 had a frequency of 14 kilocycles. The resulting interval frequency is then 28 kilocycles.

Broadly speaking, the function of the portion of the equalizer-adjusting circuit to the left of the switch 6, the components of which have been described in some detail above, is to apply to the line 7 through the filter 5 a signal suitable for use in measuring the output of the equalizer 8. The function of the filter 5 is to limit the signal to the frequency band to be equalized. It may be omitted if the source 1 is already so limited. As shown, the equalizer 8, to be described more fully hereinafter, has three independently adjustable control elements 53, 54, and 55 shown schematically as variable resistors. It is to be understood, however, that the invention is applicable to equalizers having any number of control elements, including a single one. One side of the equalizer 8 may be grounded, as shown at 56.

The weighting-averaging circuit 10, to be described in detail below, is connected across the output of the equalizer 8 between the point 76 and the ground 56. The output of the circuit 10 is used in determining the required adjustments of the equalizer control elements 53, 54, and 55 to effect the desired equalization of the line 7.

To recapitulate, in Fig. 1 a constant-level sweep frequency from the source 1 is sent over the upper branch 3, or converted to a pair of sweep frequencies in the lower branch 4, transmitted through the filter 5, over the line 7, and through the equalizer 8, and converted in the circuit 10 to direct-current voltages which are utilized to determine the proper settings for the equalizer 8.

The weighting-averaging circuit 10 comprises three pairs of weighting networks 70, 70′, 71, 71′, and 72, 72′, two detectors 73, 74, two resistors 94, 95, a voltmeter 75, and three switches 77, 78, 79. The switches are ganged together for unitary operation as indicated by the broken line 80 connecting them. The networks and the detectors are all connected on one side to a common ground, as shown. The switch 77 is connected to the high-side output of the equalizer 8 at the point 76. The switch 78 is connected to the input terminal 96 of the detector 73 and the switch 79 to the input terminal 98 of the detector 74. The weighting networks are connected in pairs at their input ends to the contacts associated with the switch 77. The networks 70, 70′ are thus connected to the contact 83, the networks 71, 71′ to the contact 84, and the networks 72, 72′ to the contact 85. At their output ends the networks 70, 71, and 72 are connected, respectively, to the contacts 87, 88, 89 associated with the switch 78. The networks 70′, 71′, 72′ are similarly connected to the contacts 90, 91, and 92 associated with the switch 79. The output terminals 97, 99 of the detectors 73, 74 are connected through the resistors 94, 95, respectively, to the voltmeter 75.

Figure 7:
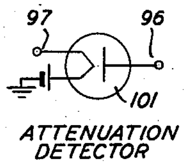
Figs. 7 and 8 show the circuits, respectively, of a plus and a minus attenuation detector suitable for use in the circuit of Fig. 1.
Figure 8:
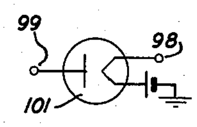

The detector 73 is indicated as plus (+) and the detector 74 as minus (−). When the circuit is being used for attenuation equalization, the plus detector 73 may be a diode 101 as shown in Fig. 7. The plate is connected to the terminal 96 and the cathode to the terminal 97. In Fig. 7, the terminals 96 and 97 correspond to the similarly designated terminals shown in Fig. 1. The function of the detector 73 is to convert the alternating-current signal at the input terminal 96 to a positive direct-current signal proportional thereto which appears at the output terminal 97. A similar circuit may be used for the minus detector 74 except that the input and output terminals are reversed, as shown in Fig. 8. In Fig. 8, the terminals 98, 99 correspond to the similarly numbered terminals in Fig. 1. The detector 74 converts the alternating-current signal at the input terminal 98 to a proportional negative direct-current signal at the output terminal 99.

Figure 9:
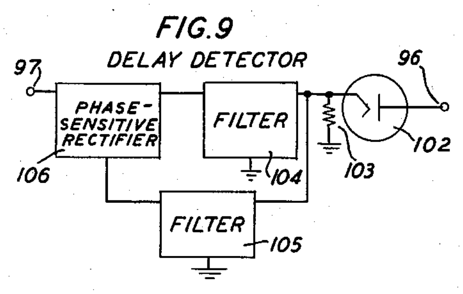
Fig. 9 shows, partly in block, a delay detector suitable for use in the circuit of Fig. 1.

When delay rather than attenuation is to be equalized, the equalizer 8 is a delay equalizer and the detectors 73 and 74 are adapted to detect delay. In this case, a suitable circuit for the plus detector 73 is shown in Fig. 9, where the input terminal 96 and the output terminal 97 correspond to the similarly designated terminals in Fig. 1. The delay detector shown in Fig. 9 comprises a diode 102, a resistor 103, two wave filters 104, 105, and a phase-sensitive rectifier 106. The plate of the diode 102 is connected to the input terminal 96. The resistor 103 is connected between the cathode and ground to constitute the load. The output of the diode 102 is connected in parallel to the input ends of the filters 104 and 105. The outputs of these filters are connected to the phase-sensitive rectifier 106, a suitable circuit for which is disclosed, for example, in my Patent 2,434,273, issued January 13, 1948. The input signals at the terminal 96 are rectified by the diode 102 to produce across the load resistor 103 the difference frequency generated by the modulator 12 of Fig. 1. This difference frequency is phase modulated by the delay characteristic of the line 7 and the delay equalizer 8. This characteristic is repeated in a period $t_2$, as shown in Fig. 3. Thus, the signal on the resistor 103 comprises a carrier and various sidebands spaced at $1/t_1$ or $1/t_2$ intervals. The filter 105 has a narrow band which excludes the sidebands but transmits to the rectifier 106 a carrier wave of constant amplitude and phase. The filter 104, however, has a band wide enough to transmit all of the important sidebands to the rectifier 106. The output of the phase-sensitive rectifier 106, appearing at the terminal 97, is a positive direct-current voltage which is a measure of the deviations from constant delay. The circuit shown in Fig. 9 may also be used for the minus detector 74, except that the output polarity of the rectifier 106 is reversed so that there is delivered to the output terminal 99, Fig. 1, a negative direct-current voltage which is also a measure of the deviations from constant delay.

In Fig. 1, the resistors 94 and 95 are normally equal. They have values sufficiently large to prevent troublesome interaction between the detectors 73 and 74. The voltmeter 75 is preferably of the type having its zero at the center of the scale.

The operation of one embodiment of the equalizer-adjusting circuit in accordance with the invention will now be described. It will be assumed that the attenuation distortion of the line 7 is to be corrected. The equalizer 8 will, therefore, be an attenuation equalizer and the switches 2 and 6 will be thrown to the upper positions, as shown, to connect the source 1 to the line 7 via the upper path 3 and the filter 5. It will be further assumed that the switches 77, 78, and 79 are thrown to the upper positions shown in Fig. 1. Thus, the point 76 is connected through the weighting network 70 to the plus detector 73 and through the weighting network 70' to the minus detector 74. It is also assumed that the networks 70 and 70' together furnish an appropriate weighting function for the equalizer shape controlled by the adjustable element 53. For example, the network 70 may provide the positive part of the weighting function and the network 70' the negative part. The requirement is that the sum of the two network characteristics, one being positive and the other negative, add up to the desired weighting function. It is only the fact that the weighting function may have to change polarity with frequency that necessitates two networks. The reading on the voltmeter 75, which is the combined outputs of the detectors 73 and 74, is an indication of the direction and amount of the required adjustment of the control 53. A positive reading means that the control 53 should be adjusted in one direction and a negative reading that it should be changed in the opposite direction. The magnitude of the voltage reading corresponds to the amount of adjustment required. Therefore, the control 53 is moved in the proper direction until the voltmeter 75 reads zero or a minimum. The amount of the equalizer shape associated with the control 53 is now properly adjusted.

To find the proper setting for the control element 54, the switches 77, 78, and 79 are thrown, respectively, to the contacts 84, 88, and 91. The weighting networks 71 and 71' are thus substituted for 70 and 70'. The networks 71 and 71', in combination, provide a weighting function appropriate for the equalizer shape controlled by the element 54. Now, the control 54 is adjusted until the voltmeter 75 reads zero or a minimum. To adjust the third equalizer shape, the switches 77, 78, and 79 are thrown to their extreme lower positions to connect into circuit the appropriate weighting networks 72 and 72' and the control 55 is adjusted for a zero or minimum reading on the voltmeter 75. If the characteristics of the weighting networks are properly related to each other and to the equalizer shapes, no readjustment will be required unless, of course, the attenuation of the line 7 changes. The adjustment of each shape is substantially independent of the adjustment of the other shapes. Because of this feature, the adjustment procedure is considerably shortened.

To recapitulate, the source 1 sends a constant-level swept or multiple-frequency signal over the transmission line 7 and through the equalizer 8. At the receiving point 76, the system characteristic, on a unit basis, is $1+S(f)$, where unity is the flat transmission and $S(f)$ is the equalization error shape. Between the point 76 and the voltmeter 75, the weighting networks such as 70, 70' and the detectors 73, 74 introduce a characteristic $G(f)$, which may be positive or negative depending upon the relative transmissions of the networks 70, 70'. By choosing one of the equalization shapes to be a flat characteristic so that for the other shapes $$\overline{G(f)}=0 \qquad (14)$$

the meter 48 will read $\overline{S(f)G(f)}$ directly. As shown by Equation 5, this voltage reading is proportional to the factor $k_n$, the amount of the $n$th equalizer shape to be introduced by the adjustment of a control such as 53. If flat gain is not one of the equalizer shapes, if the shape involved is a flat shape, or if for any other reason Equation 14 is not satisfied, the meter 75 reads $$\overline{G(f)}+\overline{S(f)G(f)}$$

However, since the value of $\overline{G(f)}$ is known, the effective zero point on the meter scale may be shifted to allow therefor. In most practical cases, Equation 14 is satisfied and no correction to the reading of the meter is required.

In a second embodiment of the invention, the weighting-averaging circuit 10 of Fig. 1 is simplified by the omission of the networks 70', 71', 72', the detector 74, and the associated switch 79. If each of the weighting functions $G(f)$ has a value of only one polarity, the functions may be provided by the remaining networks 70, 71, 72. The required value of $k_n$ is found by connecting the appropriate network 70, 71, or 72 into the circuit by means of the switches 77 and 78 and reading the meter 75. If the weighting function $G(f)$ has both positive and negative values, two meter readings are required to determine the proper adjustment of each equalizer shape. One of the networks, say 70, is built to provide a characteristic $1+G(f)$, which is positive throughout the entire frequency range. With the network 70 connected into the circuit, the meter 75 reads $\overline{(1+S)(1+G)}$ which, expanded, is $1+\bar{S}+\bar{G}+\overline{SG}$. Another of the networks, say 71, is designed to have a characteristic $\bar{G}=0$. The network 71 may, for example, be simply an attenuator. Now, with the network 71 substituted for the network 70, the meter 75 reads $1+\bar{S}$. The difference between these two readings is $\bar{G}+\overline{SG}$, the value of $k_n$ required for adjusting one of the equalizer shapes.

A third embodiment of the invention is particularly suited to the case where the equalizer shapes are orthogonally related and form adequate weighting functions for their own adjustment. The circuit of Fig. 1 is modified by the omission of the networks 71, 72, 70', 71', 72', the detector 74, and the switch 79. The remaining network 70 may be simply a through electrical connection. Thus, with the switches 77 and 78 in the positions shown, the point 76 is connected directly to the detector 73. An important example of this embodiment is where the equalizer shapes form a Fourier series of the type shown in Fig. 10, discussed in greater detail below. As Equations 12 and 13 show, the shapes themselves are the same as, and therefore form, their own weighting functions. The adjustment procedure is very simple. Each of the equalizer controls 53, 54, and 55 is adjusted, in turn, for a minimum reading on the meter 75. When the equalizer 8 is correctly adjusted, a change in either direction of any one of the controls will increase the meter reading.

As already pointed out, there is no necessary restriction on the shapes introduced by the equalizer 8. As examples, Figs. 10, 11, 12, and 13 show four general classes of suitable shapes. Three of these classes are orthogonal. They are first, a Fourier series (Fig. 10), second, overlapping non-harmonic (Fig. 11), and third, non-overlapping bump shapes (Fig. 12). These have the advantage that no weighting networks are required and, therefore, the simple adjusting technique of the third embodiment, described above, may be used. However, if the flat loss of the line 7 is changing rapidly, a more precise adjustment of the equalizer may be obtained if suitable weighting networks are employed and the first or second embodiment is used. The fourth class of equalizer shapes are the overlapping, non-orthogonal characteristics shown in Fig. 13. While these shapes will be discussed only on an attenuation basis, similar relationships apply where the shapes are delay characteristics. The adjusting technique is equally applicable to either attenuation or delay equalizers.

Figure 10:
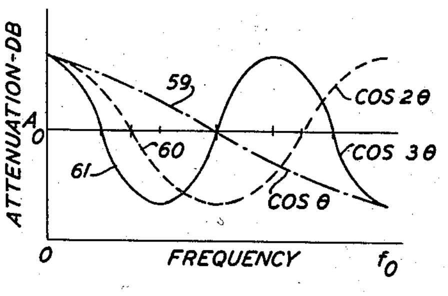
Fig. 10 shows three harmonically related cosine shapes suitable for the equalizer shown in Fig. 1.

Illustrative of a Fourier series, Fig. 10 shows the attenuation characteristics of three shapes of a suitable cosine attenuation equalizer over the frequency range to be equalized, from zero to $f_0$. The curves 59, 60, and 61 correspond, respectively, to the fundamental and the first two harmonic terms. An infinite series of such terms is capable of describing any continuous function. However, a finite number of terms will provide sufficiently accurate equalization in most cases. In practice, it has been found that 25 terms, that is, 25 equalizer shapes, will give excellent equalization. The flat loss $A_0$ is the characteristic obtained when each of the control elements 53, 54, and 55 is set at the center of its adjustable range. As each control is moved off center, a proportional positive or negative amount of the corresponding cosine shape is introduced into the equalizer 8. Each of the equalizer shapes, therefore, has an attenuation characteristic given by $$S_n(f)=A_0+k_n \cos n\theta \qquad (15)$$

where $\theta$ is the phase angle of the fundamental, $k$ is a numerical constant which depends upon the setting of the control and may be either positive or negative, and $n$ identifies the particular equalizer shape. A suitable cosine equalizer circuit is disclosed in United States Patent 2,348,572, to P. H. Richardson, issued May 9, 1944.

In Fig. 10, the fundamental, curve 59, is shown as a true cosine shape and, therefore, its phase $\theta$ is linearly proportional to the frequency $f$, as shown by the broken-line curve 63 in Fig. 14. The broken-line curve 65 of Fig. 15 shows a typical frequency-time characteristic of the output from the sweep source 1 at the terminals 14, 15 when the warping network 22 is omitted. The frequency rises linearly from zero at the time $t_0$ to $f_0$ at $t_1$ and then descends linearly to zero again at $t_2$. This type of scanning characteristic is suitable for use with an equalizer 8 whose phase-frequency characteristic is linear, as shown by the curve 63 of Fig. 14.

Figure 5:
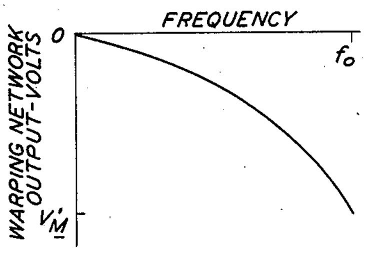
Fig. 5 is a typical output voltage versus frequency characteristic of the warping network shown in Fig. 4.

In some cases, however, it is found that closer equalization is obtainable if the equalizer shapes are distorted cosine curves. The phase-frequency characteristic of the fundamental equalizer shape may, for example, be of the form shown by the solid-line curve 64 of Fig. 14, which is concave upward. In this case, it is advantageous, but not always essential, to warp the frequency scale of the scan, by compressing it at the low frequencies and stretching it at the high frequencies, to compensate for the non-linearity of the phase-frequency characteristic. This is accomplished by inserting a warping network 22 whose voltage-frequency characteristic, as shown in Fig. 5, corresponds to the phase-frequency curve 64 of Fig. 14, to produce a concave downward scanning characteristic such as shown by the solid-line curve 66 of Fig. 15 and thereby make the variation of the phase versus time characteristic linear.

When the equalizer 8 has harmonic cosine shapes such as those shown in Fig. 10, no weighting networks are required. However, as already mentioned, the precision of adjustment may generally be improved by providing them. This is especially true if the flat loss of the transmission line is varying rapidly at the time the equalizer is being adjusted. Appropriate transmission characteristics for the weighting networks may, for example, be of the form $1+\cos n\theta$ for the network 70 and $1-\cos n\theta$ for the network 70'. It will be assumed that these networks have such characteristics and that the line 7 and the equalizer 8 have, in combination, a characteristic $1+k_n \cos n\theta+k_m \cos m\theta$, where $m$ does not equal $n$. Then, at the input terminal 96 of the detector 73 there will be a signal characteristic $$(1+\cos n\theta)(1+k_n \cos n\theta+k_m \cos m\theta)$$

and at the input terminal 98 of the detector 74 a signal characteristic $(1-\cos n\theta)(1+k_n \cos n\theta+k_m \cos m\theta)$. Since the scanning by the sweep source 1 makes $\theta$ proportional to time and $\theta$ varies between zero and 180 degrees, there will appear at the output terminal 97 a direct-current envelope like that at the terminal 96 and at the output terminal 99 the negative of the envelope at the terminal 98. Since the average of $\cos n\theta \cos m\theta$ is equal to zero when $m$ does not equal $n$, the voltmeter 75 reads an average signal which is simply $k_n$, the desired adjustment factor.

Figure 11:
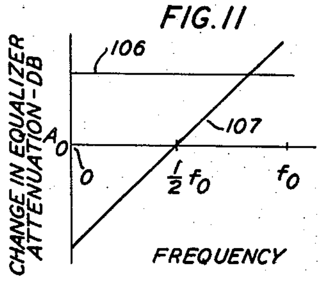
Fig. 11 shows a pair of overlapping, orthogonal, non-harmonic equalizer shapes.
Figure 12:
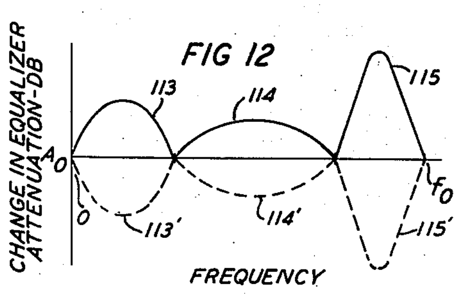
Fig. 12 shows three non-overlapping, orthogonal, equalizer shapes.

In Fig. 11, the curves 106 and 107 are a representative pair of overlapping, non-harmonic, orthogonal, equalizer shapes. By definition, two functions $f(x)$ and $f'(x)$ are orthogonal over an interval $(a, b)$ if $$\int_a^b f(x)f'(x)dx=0 \qquad (16)$$

that is, if the integral of the product of the functions is zero over the interval. Each of the curves is a straight line over the frequency range from zero to $f_0$. The curve 106 has zero slope and its departure from the constant flat loss $A_0$ may be expressed as $k_1$. The curve 107 passes through $A_0$ at the frequency $f_0/2$ and has a positive slope. Its departure from $A_0$ may be expressed as $k_2(f-f_0/2)$. It will be understood that, by adjustment, the curve 106 may be raised or lowered and the curve 107 rotated about a pivot point at $f_0/2$. If these relationships are inserted into Equation 16, it is found that the curves 106 and 107 are orthogonal over the frequency interval $f_0$. In many practical cases, it is possible to orthogonalize equalizer shapes by warping the frequency scale. As already explained, this may be accomplished by means of the warping network 22 shown in Fig. 2. As mentioned above, the advantage of orthogonal equalizer shapes is that they provide their own weighting functions and no additional weighting networks are required. The fact that this is so may be deduced by comparing Equations 10, 11, and 16. This comparison brings out the important point that each weighting function must be orthogonal to all equalizer shapes except the one for which it is the weighting function.

Fig. 12 shows three non-overlapping, bump shapes. These are also orthogonal, because at any frequency all the shapes but one are zero. The solid-line curves 113, 114, and 115 show the upper adjustment limits and the broken-line, mirror-image curves 113', 114', and 115' show, respectively, the lower limits. No added weighting networks are required when the equalizer 8 has shapes of this type.

Figure 13:
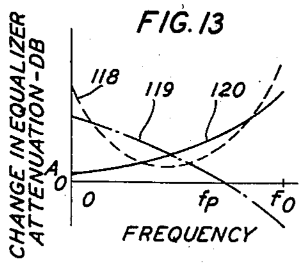
Fig. 13 shows three overlapping, non-orthogonal equalizer shapes.

To represent the fourth class of equalizer shapes, Fig. 13 shows three overlapping, non-orthogonal curves 118, 119, and 120 at their upper adjustment limit. The mirror-image lower adjustment limits are not shown. The curve 119 pivots about the point $f_P$, $A_0$. When the equalizer 8 has non-orthogonal shapes, weighting networks must be used. The choice of weighting functions must be guided by the relationship of the shapes to the transmission distortion shapes expected in the line 7 to be equalized. This choice wil affect the accuracy of equalization obtainable except in the rare case when the equalizer is capable of providing substantially perfect equalization. For example, each of the weighting networks such as 70, 71, and 72 may have a transmission characteristic made up of linear combinations of the shapes 118, 119, and 120. However, the networks would differ from each other in the relative amounts, the polarities, or both, of the component shapes employed.

It is to be understood that the above-described arrangements are illustrative of the application of the principles of the invention. Numerous other arrangements may be devised by those skilled in the art without departing from the spirit and scope of the invention.

What is claimed is:

1. In combination, a transmission path having a transmission characteristic which exhibits undesired frequency-dependent distortion over a range of frequencies, an equalizer having an adjustable shape connected in the path, a constant-level, multiple-frequency voltage source covering the range connected to one end of the path, a first network having a transmission characteristic which is constant with frequency connected at one end to the other end of the path, a detector connected to the other end of the first network, an averaging voltmeter connected to the output end of the detector, a second network, and means for substituting the second for the first network, the second network being a weighting network having a transmission characteristic such that the voltmeter reading due to the second network, minus the voltmeter reading due to the first network, indicates the direction and the amount of the adjustment of the equalizer shape required to achieve optimum correction of the distortion.

2. The combination in accordance with claim 1 in which said equalizer is adapted to compensate attenuation distortion in said path.

3. The combination in accordance with claim 1 in which said equalizer is adapted to compensate delay distortion in said path.

4. The combination in accordance with claim 1 which includes an attenuation predistorter connected in said path.

5. The combination in accordance with claim 1 which includes a delay predistorter connected in said path.

6. The combination in accordance with claim 1 which includes means for restricting the transmission through said path to said range.

7. The combination in accordance with claim 1 in which the equalizer has a second adjustable shape and which includes a third network and means for substituting the third for the first network, the third network being a weighting network having a transmission characteristic such that the voltmeter reading due to the third network, minus the voltmeter reading due to the first network, indicates the direction and the amount of the adjustment of the second equalizer shape required to achieve optimum correction of the distortion by the second shape.

8. In combination, a transmission path having a transmission characteristic which exhibits undesired frequency-dependent distortion over a range of frequencies, an equalizer having two adjustable shapes connected in the path, means for impressing upon one end of the path a constant-level, multiple-frequency voltage covering the range, a first weighting network connected at one end to the other end of the path, a detector connected to the other end of the network, an averaging voltmeter connected to the output end of the detector, the network having a transmission characteristic which produces a reading on the voltmeter indicating the direction and the amount of the adjustment of the first of the equalizer shapes required to achieve optimum correction of the distortion by the first shape, a second weighting network, and means for substituting the second for the first network, the second network having a transmission characteristic which produces a reading on the voltmeter indicating the direction and the amount of the adjustment of the second of the equalizer shapes required to achieve optimum correction of the distortion by the second shape.

9. The combination in accordance with claim 8 in which said equalizer is adapted to compensate attenuation distortion in said path and said detector is adapted to detect attenuation.

10. The combination in accordance with claim 8 in which said equalizer is adapted to compensate delay distortion in said path and said detector is adapted to detect delay.

11. The combination in accordance with claim 8 in which said detector comprises a diode and a phase-sensitive rectifier connected in tandem, a wide-band wave filter interposed therebetween, and a narrow-band wave filter connected between said rectifier and said diode.

12. In combination, a transmission path having a transmission characteristic which exhibits undesired distortion over a range of frequencies, an equalizer having two adjustable shapes connected in said path, means for impressing upon one end of said path a multiple-frequency voltage covering said range, a pair of weighting networks connected at their input ends in parallel to the other end of said path, a pair of oppositely poled detectors connected at their input ends, respectively, to said networks, a voltmeter connected to the output ends of said detectors, said networks having transmission characteristics which in combination produce a reading on said voltmeter which indicates the direction and the amount of the adjustment of one of said equalizer shapes required to achieve optimum correction of said distortion by said one shape, a second pair of weighting networks, and means for substituting said second pair for said first pair of networks, said second pair of networks having transmission characteristics which in combination produce a reading on said voltmeter which indicates the direction and the amount of the adjustment of the other of said equalizer shapes required to achieve optimum correction of said distortion by said other shape.

13. The combination in accordance with claim 12 in which said shapes are overlapping, non-orthogonal curves.

14. The combination in accordance with claim 12 in which said equalizer shapes are orthogonally related over said range.

15. The combination in accordance with claim 14 in which said shapes are harmonically related cosine curves.

16. The combination in accordance with claim 14 in which said shapes are overlapping non-harmonic curves.

17. The combination in accordance with claim 14 in which said shapes are non-overlapping curves of the bump type.

References Cited in the file of this patent

UNITED STATES PATENTS

| | | |
|---|---|---|
| 2,102,138 | Strieby | Dec. 14, 1937 |
| 2,337,541 | Burgess | Dec. 28, 1943 |
| 2,465,531 | Green | Mar. 29, 1949 |
| 2,625,614 | Sebelleng | Jan. 13, 1953 |
| 2,753,526 | Ketchledge | July 3, 1956 |